INVENTORS
WILLIAM LADER
DONALD H. ZANG

United States Patent Office 3,532,652
Patented Oct. 6, 1970

3,532,652
POLYISOCYANATE-ACRYLATE
POLYMER ADHESIVES
Donald H. Zang, Pequannock, N.J., and William Lader,
Staten Island, N.Y., assignors to PPG Industries, Inc.,
a corporation of Pennsylvania
Filed July 14, 1966, Ser. No. 565,190
Int. Cl. C08g 41/00, 41/04; C09j 7/02
U.S. Cl. 260—23
15 Claims

ABSTRACT OF THE DISCLOSURE

Pressure-sensitive adhesives usable on thin, flexible backings or as film adhesives comprise alkyl acrylate interpolymers containing one or more functional monomers with functional groups such as carboxyl, hydroxyl, amino, amido or substituted amido. The interpolymer is at least partially cross-linked with an organic polyisocyanate. The adhesives described are resistant to heat, water and solvents and form stronger bonds than ordinary acrylic pressure-sensitive adhesives; they also resist migration of plasticizers making them particularly suitable for use on plasticized vinyl polymer substrates.

Figure 1:
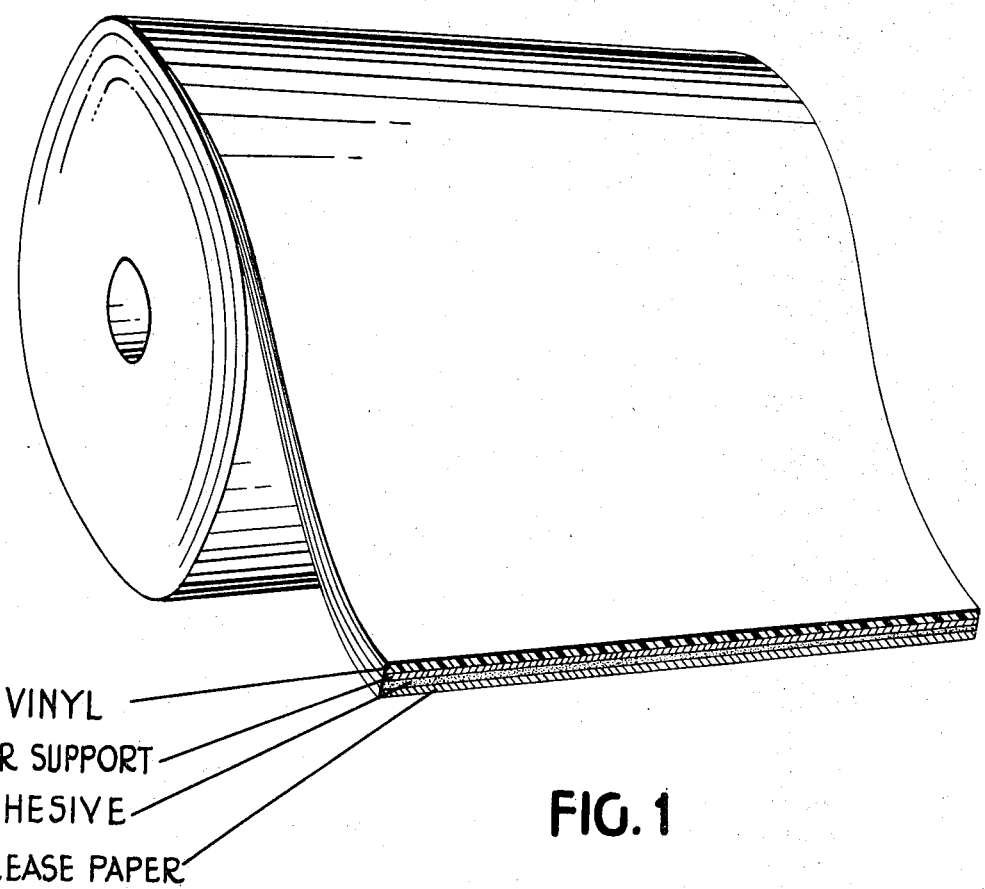

This invention relates to compositions useful as pressure-sensitive adhesives and having a unique and superior combination of properties, and more particularly to such compositions in which an acrylic interpolymer is combined with an organic polyisocyanate.

A number of compositions have been proposed for use as pressure-sensitive adhesives. The pressure-sensitive character of such adhesives arises because they are normally tacky and adhere immediately upon application with relatively light pressure. The best pressure-sensitive adhesives known heretofore have been based either on natural or synthetic rubber, used along with a resinous tackifier, or on polymers of vinyl ethers or acrylic esters. For instance, a very useful type of acrylic pressure-sensitive adhesive is described in Reissue Pat. 24,906 and consists of one or more acrylate esters copolymerized with a monomer containing one of certain functional groups.

Because pressure-sensitive adhesives have an elastoviscous nature, such adhesives normally have a lower bonding strength than other adhesives, such as heat or solvent activated adhesives. Further, as a normal consequence of the inclusion of the required properties for pressure-sensitivity, it has been necessary to tolerate a lower water resistance, lower solvent resistance, lower heat resistance and other less than optimum properties in such compositions.

These deficiencies are a continual problem with such adhesives, and become of particular concern when the adhesive is coated on substrates containing relatively low molecular weight components. Such components include many plasticizers and other additives commonly utilized in formulating plastics and other materials and these migrate from the substrate into the adhesive, thereby softening the adhesive and further lowering its physical properties. The characteristics of the substrate itself are also often changed. One example of this type of behavior is found when conventional pressure-sensitive adhesives are coated on "vinyls," that is, vinyl halide polymers, which when employed for this purpose contain plasticizers including low molecular weight migratory components. Even when the vinyl is supported on paper or other material and the adhesive is coated on the support, migration of plasticizer can occur and, in addition, the materials and additives in the support itself often affect the adhesive.

It has now been found that a combination of an organic polyisocyanate with an acrylic interpolymer containing a functional monomer having an active hydrogen atom, and which is thus coreactive with isocyanato groups, provides pressure-sensitive adhesives having a number of improved properties. For example, these adhesives are more heat-resistant, more water-resistant, have substantially higher bond strength when heated and aged, are more solvent resistant, and are generally superior to the conventional rubber-resin adhesives, vinyl ether polymer adhesives, and acrylate ester adhesives known heretofore.

Figure 2:
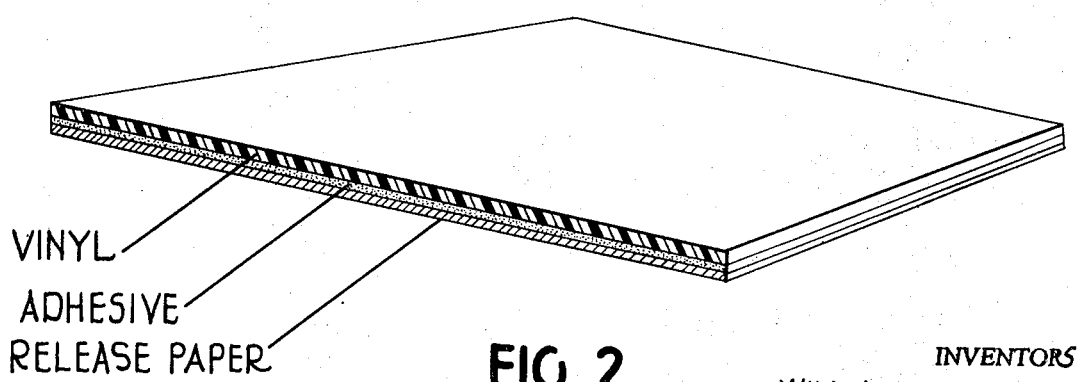

Moreover, a specific and highly desirable advantage of these adhesives is that they resist the migration of plasticizers and other low molecular weight components, such as from supported and unsupported vinyl substrates. The drawings herein illustrate the invention in this embodiment; FIG. 1 shows a roll of coated vinyl with a paper support layer, and FIG. 2 shows a sheet of coated unsupported vinyl.

The essential components of the adhesives herein include an organic polyisocyanate and an acrylic interpolymer containing active hydrogen atoms. The acrylic interpolymer is a normally tacky interpolymer of one or more alkyl acrylates in which the alkyl groups have a linear carbon chain of from about 4 to about 12 carbon atoms, along with one or more other polymerizable ethylenic monomers, at least one of which has a functional group having an active hydrogen atom.

The functional monomer should be present in an amount sufficient to provide from 0.005 to 0.210 equivalent of functional group for each one hundred grams of interpolymer. While ordinarily a single interpolymer containing the required amount of functional groups is employed, there can be used, if desired, a mixture of interpolymers of which one or more can contain more than the desired amount of functional monomers, with one or more others having less than this amount or even none. It is only necessary that the total functional groups be as specified, based on the total amount of interpolymer.

An alkyl acrylate or alkyl acrylates of 4 to 12 carbon atoms in the alkyl group should form at least about 30 percent by weight of the interpolymer. Among the acrylates that can beused are butyl acrylate, amyl acrylate, hexyl acrylate, octyl acrylate, 2-ethylhexyl acrylate, heptyl acrylate, decyl acrylate and lauryl acrylate. The active hydrogen-containing functional group can be in any ethylenically unsaturated monomer copolymerizable with the alkyl acrylate. (By "active hydrogen" is meant hydrogens reactive with Zerewitinoff reagent.) The types of functional groups containing active hydrogen are, of course, well known, and those functional groups contained in the monomers most often employed include carboxyl, hydroxyl, amino, amido, N-hydroxyalkyl amido and N-alkoxyalkyl amido.

Carboxyl-containing monomers are generally preferred, and the most often used monomers of this type are acrylic acid and methacrylic acid. However, there may also be employed other polymerizable ethylenic acids, including unsaturated monocarboxylic acids, such as crotonic acid, as well as monoesters of dicarboxylic acids, such as monobutyl maleate, methyl hydrogen fumarate and similar materials. There can also be employed unsaturated dicarboxylic acids such as maleic acid, fumaric acid and itaconic acid. It is usually desirable that the unsaturated carboxylic acid have not more than about six carbon atoms attached to the carboxyl group through carbon to carbon linkages.

Hydroxyl-containing monomers that can be employed include hydroxylalkyl esters of alpha, beta-ethylenically unsaturated carboxylic acids, such as 2-hydroxyethyl acrylate and methacrylate, 2-hydroxypropyl acrylate and methacrylate, 2,3-dihydroxypropyl acrylate and methacrylate, 6,10-dihydroxydecyl acrylate and methacrylate, and similar alkylene glycol monoesters of unsaturated acids. Included are the corresponding esters of unsaturated dicarboxylic acids, such as maleic acid. Unsaturated aliphatic alcohols are other examples of hydroxyl-containing monomers, for instance, allyl alcohol, methylallyl alcohol, allyl carbinol, beta-allyl ethyl alcohol, vinyl ethyl carbinol, and the like. Other hydroxyl-containing monomers that can be used in some cases include 2-hydroxyethyl vinyl ether and 2-hydroxyethyl vinyl sulfide, similar compounds in which both a hydroxyl group and a polymerizable ethylenic group are present.

Amino-containing monomers that can be employed are exemplified by the various aminoalkyl esters of unsaturated carboxylic acids. Esters of acrylic acid, methacrylic acid, ethacrylic acid, and the like are preferred, and some examples of these esters are 2-aminoethyl methacrylate, 3-aminopropyl methacrylate, N-methylaminoethyl acrylate, N-butylaminoethyl acrylate, N-methylaminoethyl methacrylate, bis(N-methylaminoethyl)maleate, and similar compounds. Other monomers containing an amino group along with a polymerizable ethylenic linkage include such compounds as aminoethyl vinyl ether and aminoethyl vinyl sulfide.

In many cases, amino-containing monomers are difficult to obtain and require particular conditions to copolymerize, because of the reactivity of the amino group with unsaturated linkages. This is especially true where a primary amino group is concerned. For such reasons, a desirable method of incorporating amino groups in the interpolymer is to copolymerize an acid, such as acrylic acid or the other acids mentioned above, and then react the carboxyl-containing interpolymer with an alkylenimine, such as ethylenimine or 1,2-propylenimine. Using acrylic acid and ethylenimine, for example, the product contains groups equivalent to those obtained by copolymerizing 2-aminoethyl acrylate. For purposes of this invention, therefore, polymers containing imine-modified acid groups are considered equivalent to the corresponding polymers containing aminoalkyl groups.

The preferred amido-containing monomers which can be employed as the active hydrogen-containing component of the interpolymers herein, are the unsaturated carboxylic acid amides, such as acrylamide, methacrylamide, itaconic diamide, and the like. However, other compounds such as N-carbamyl maleimide and similar imide derivatives can be used, as can other polymerizable monomers containing an amido group in an ethylenically unsaturated molecule.

Substituted amido compounds are also useful. These include alkylolated amides, in which the amido group is reacted with an aldehyde, for example, N-methylol derivatives of the foregoing unsaturated carboxylic acid amides. N-methylol acrylamide and N-methylol methacrylamide are the most often used monomers of this type. Similarly, there may be employed aldehyde-modified and etherified derivatives of the foregoing amides; these contain an N-alkoxy-alkyl-substituted amido group and are exemplified by such compounds as N-methoxymethyl acrylamide, N-ethoxymethyl acrylamide, N-butoxymethyl acrylamide, and N-butoxymethyl methacrylamide.

Several monomers having different functional groups containing active hydrogen atoms can be included in the interpolymer if desired. The use of such a mixture can in some instances provide a desirable combination of properties.

If desired, the acrylic interpolymer can be made up entirely of the functional monomer and the alkyl acrylate or acrylates as described. There may also be included other copolymerizable monomers not having an active hydrogen atom, provided at least about 30 percent by weight of the interpolymer is the alkyl acrylate component and the functional monomer is present in an amount sufficient to provide from 0.005 to 0.210 equivalent of the functional group for each 100 grams of the interpolymer.

If an additional monomer or monomers are included, any ethylenic monomer copolymerizable with the alkyl acrylate and functional monomer employed can be utilized, and the amount of such additional monomer, based upon the total weight of monomers other than the functional monomer, can be up to 70 percent of this total. In all cases, however, the monomers and their proportions should be chosen so as to provide a normally tacky interpolymer. The monomers that can be employed include, for example, monoolefinic hydrocarbons, such as styrene and vinyl toluene; halogenated monoolefinic hydrocarbon, such as vinyl chloride and vinylidene chloride; esters such as vinyl acetate, ethyl methacrylate, ethyl acrylate, octadecyl acrylate, isopropyl acrylate, isopropenyl acetate, and dimethyl maleate; and dienes such as 1,3-butadiene.

Some examples of interpolymers suitable for use in the adhesive compositions herein are as follows:

Interpolymer A: Weight percent
    2-ethylhexyl acrylate _____ 50.0
    Vinyl acetate _____ 47.0
    Acrylic acid _____ 3.0
Interpolymer B:
    2-ethylhexyl acrylate _____ 60.0
    Ethyl acrylate _____ 27.5
    Vinyl acetate _____ 70.0
    Acrylic acid _____ 2.5
    2-hydroxypropyl methacrylate _____ 3.0
Interpolymer C:
    2-ethylhexyl acrylate _____ 50.0
    Vinyl acetate _____ 45.2
    2-aminoethyl methacrylate _____ 4.8
Interpolymer D:
    2-ethylhexyl acrylate _____ 60.0
    Ethyl acrylate _____ 37.5
    Acrylamide _____ 2.5
Interpolymer E:
    2-ethylhexyl acrylate _____ 65.0
    Butyl acrylate _____ 23.0
    Vinyl acetate _____ 7.5
    N-methylol acrylamide _____ 4.5
Interpolymer F:
    2-ethylhexyl acrylate _____ 58.2
    Vinyl acetate _____ 39.2
    Maleic anhydride _____ 2.6
Interpolymer G:
    Butyl acrylate _____ 77.0
    Vinyl ethyl ether _____ 10.0
    Acrylic acid _____ 13.0
Interpolymer H:
    2-ethylhexyl acrylate _____ 60.0
    Vinyl acetate _____ 7.0
    Methyl acrylate _____ 23.0
    Methyl hydrogen fumarate _____ 10.0

The other essential component of the adhesives herein is an organic polyisocyanate, which can be hydrocarbon polyisocyanate, an isocyanato-terminated prepolymer, or any other organic compound containing two or more isocyanato groups. A mixture of such compounds can also be employed.

Among the hydrocarbon polyisocyanates that can be utilized are aromatic, aliphatic and cycloaliphatic diisocyanates and triisocyanates, as well as combinations of these types. Representative hydrocarbon polyisocyanates include 2,4-toluene diisocyanate m-phenylene diisocyanate, 4 - chloro - 1,3 - phenylene diisocyanate, 3,3' - dimethyl-4,4' diphenylene diisocyanate, 4,4'-diphenylene diisocyanate, 1,5-naphthalene diisocyanate, 1,4-tetramethylene diisocyanate, 1,6-hexamethylene diisocyanate, 1,10-decamethylene diisocyanate, 1,4-cyclohexylene diisocyanate, 4,4'-methylene bis(cyclohexyl isocyanate), 1,5-tetrahydronaphthalene diisocyanate, paraxylylene diisocyanate, durene diisocyanate, and 1,2,4-benzene diisocyanate. The polyisocyanates may contain other substituents, although those which are free from reactive groups other than isocyanato groups are ordinarily preferred. Dimers and trimers of monomeric diisocyanates and di(isocyanato aryl) ureas, such as di(3-isocyanato-4-methylphenyl) urea, may also be used.

Particularly useful organic polyisocyanates are the so-called "prepolymers" in which a polyisocyanate is modified by partial reaction with a polyhydroxy compound or other compound having two or more active hydrogen atoms to provide an isocyanato-terminated product. Such products are more easily handled and are preferably employed in the compositions herein. The organic polyisocyanates used to prepare such prepolymers include any of the various compounds mentioned above, which can be reacted with essentially any polyfunctional active hydrogen-containing compound. Preferred prepolymers are made by reaction of a polyol with an organic diisocyanate, such as toluene diisocyanate. Monomeric polyols can be employed, as can polyester polyols and polyether polyols.

Polyester polyols are made by esterification of polyols with dicarboxylic acids using proportions such that the product contains free hydroxyl groups. For example, such reaction products can be made from excess propylene glycol or trimethylolpropane and adipic acid or a similar dibasic acid. Polyether polyols are hydroxyl-containing compounds containing ether linkages. These can be made, for example, by reaction of an alkylene oxide with a polyhydric compound, such as sorbitol, pentaerythritol, glycerol, sucrose, or the like. Prepolymers made from polyester polyols and polyether polyols are well known in the art and are extensively utilized in the manufacture of conventional types of polyurethanes.

Among the preferred organic polyisocyanates for use in the invention are isocyanato-terminated adducts of toluene diisocyanate and castor oil.

Some examples of specific types of prepolymers that can be utilized in the adhesives herein are as follows:

*Prepolymer J.*—Isocyanato-terminated adduct of toluene diisocyanate and castor oil; —NCO content 10.6 percent; equivalent weight 396; 100 percent solids.

*Prepolymer K.*—Isocyanato-terminated adduct of toluene diisocyanate and castor oil; —NCO content 14.5 percent; equivalent weight 290; 75 percent solids in ethyl acetate.

*Prepolymer L.*—Isocyanato-terminated adduct of toluene diisocyanate and polyether polyol; —NCO content 14 percent; equivalent weight 300; 75 percent solids in ethyl acetate.

*Prepolymer M.*—Isocyanato-terminated adduct of toluene diisocyanate and poly(oxytetramethylene) glycol; —NCO content 6.4 percent; equivalent weight 660; 100 percent solids.

*Prepolymer N.*—Isocyanato-terminated adduct of toluene diisocyanate and polyester polyol; —NCO content 6.5 percent; equivalent weight 647; 100 percent solids.

*Prepolymer O.*—Isocyanato-terminated adduct of toluene diisocyanate and sucrose polyether polyol; —NCO content 30 percent; equivalent weight 142; 100 percent solids.

In making the adhesive compositions of the invention, the amount of organic polyisocyanate employed should be sufficient to provide from about 0.01 to about 1.0 equivalent of isocyanato groups per equivalent of active hydrogen-containing functional group in the acrylic interpolymer. A more preferred level is from about 0.2 to about 0.5 equivalent of —NCO per functional group equivalent.

In addition to the foregoing essential components, the adhesive may also contain one or more tackifying additives. These impart an increased degree of pressure-sensitivity and tackiness to the finished adhesive. Tackifying resins include rosin and rosin derivatives, such as the glycerol ester of hydrogenated rosin, the methyl ester of hydrogenated rosin and the like; chlorinated biphenyl resins, such as chlorinated polyphenyl and chlorinated biphenyl; plasticizers, such as dioctyl phthalate and butyl benzyl phthalate; hydrocarbon resins, such as polymers of cyclopentadiene and polymerized petroleum fractions, coumarone-indene resins, such as polymerized coal-tar light oils; polyterpene resins such as polymerized beta-pinene; normally tacky acrylate polymers, such as polymers of the alkyl acrylates described above but without the functional co-monomer; polystyrenes, such as poly (alphamethyl styrene); and the like. In some cases, tackifying resins can be used which contain active hydrogen atoms, such as rosin-phenol resins and other resins containing phenolic constituents. When these are employed, the proportion of the other components can be adjusted accordingly.

When a tackifying resin is employed in the composition, the amount depends upon the particular properties desired and the other components, but generally it is utilized in an amount between about 10 and about 150 parts for each 100 parts by weight of the acrylic interpolymer.

The adhesive composition is usually prepared from the foregoing components by blending the ingredients along with a suitable solvent or solvent mixture. As is usually the case with isocyanate-containing compositions, it is desirable to exclude water as much as possible, and thus the solvents employed should be as anhydrous as possible. The solvents that can be generally utilized include esters, aromatic hydrocarbons, aliphatic hydrocarbons and ketones, although ketones are somewhat less desirable because they tend to retain dissolved water.

In some cases, it is desirable to add the polyisocyanate component to the composition just prior to use in order to avoid a tendency to gel prematurely. This is particularly true when the functional group on the acrylic interpolymer is an amino group. The relative concentration of the isocyanate and the functional group, as well as the conditions of storage and the likelihood that the product may be exposed to excessively high temperatures, should also be considered. The preferred compositions in which the acrylic interpolymer contains carboxyl groups are storable and these adhesives can be entirely compounded and stored under any ordinary conditions without substantial increase in viscosity. Storable compositions can also be made from interpolymers containing hydroxyl groups, with the stability of such compositions depending in large part upon the hydroxyl content of the interpolymer used and the ratio of hydroxyl groups to isocyanato groups in the adhensive. However, in making the adhesives of the invention, it is always desirable to add the organic polyisocyanate last and to avoid extensive or vigorous agitation or other treatment which may result in excessive generation of heat.

The adhesive composition can be employed in any of various forms. For example, the solution itself can be applied to the substrate to be bonded, the solvent allowed to evaporate and the other surface to be bonded brought into contact with the coated surface. In other instances, the adhesive is employed as a film, either as a free-film coated on release paper and which is transferred to the surface to be bonded at the point of use, or as coated sheet or tape in which the adhesive is an adherent dried film on a substrate.

In utilizing the adhesive, it can be merely dried, in which case a partial cross-linking occurs during the drying process and some additional cross-linking occurs slowly once the adhesive is in the dry, coated state. It is preferred, however, to dry and cure the adhesive by heating at an elevated temperature, for example, at a temperature between about 150° F. and about about 300° F. for one to fifteen minutes. The adhesive then is in its final reacted form and no further changes occur during storage.

Using the proportions of components specified herein the adhesives described in all instances retain pressure-sensitivity even after being cross-linked to whatever extent possible. However, the level of pressure-sensitivity in the cured adhesive depends upon the concentration of the monomer containing the active hydrogen atom and the ratio of isocyanato groups to active hydrogen, which affects the cross-link density. To some extent this can be modified by including other compounding ingredients, such as tackifiers or diluents, in the adhesive. Where a highly pressure-sensitive adhesive is desired it is preferred that the acrylic interpolymer be made up entirely or almost entirely of the acrylate esters having 4 or more carbon atoms in the alkyl group, along with the functional monomer.

As indicated above, the adhesives of the invention are especially adapted for use in bonding vinyl halide polymers. In such use, it is preferred that the adhesive be made as a free film and applied in a transfer operation. If desired, the vinyl can be directly coated with the adhesive solution, but the solvents desirably employed in the adhesive composition may soften certain vinyl halide resins, and the curing temperatures which are preferred and which result in optimum properties in the finished adhesive may also deleteriously affect many vinyl substrates.

Thus, in bonding a vinyl substrate or in coating a vinyl substrate to make a coated sheet or tape, it is desirable to coat and cure the adhesive on release paper (that is, paper having a coating, such as a cured silicone, which permits easy removal of the adhesive). The adhesive can then be transferred to the vinyl substrate when desired, by contact with some pressure. For instance, the adhesive film can be transferred by pressing it in contact with the vinyl substrate between squeeze rolls. The finished article then is composed of an adhesive coated on the vinyl substrate and protected on the exposed adhesive surface with release paper. Such coated vinyl materials can be rolled and stored for long periods of time without loss of desired properties. This is in contrast to ordinary pressure-sensitive adhesives, which are affected by migration of the plasticizers and similar components from the vinyl substrate.

The invention will be further described in connection with the examples set forth below. These examples should be understood, however, as being illustrative of the method and practice of the invention, and should not be construed as imposing limitations thereon. All parts and percentages are by weight unless otherwise specified.

EXAMPLE 1

An adhesive composition was made by mixing and stirring 100 parts of Interpolymer A dissolved in a mixture of 105 parts of toluene and 45 parts of isopropyl acetate, and 75 parts of dihydroabietyl phthalate. To this mixture, 2.5 parts of Prepolymer J were added. The adhesive composition had a total solids content of about 54 percent and a viscosity of 6000 centipoises. The product is stable in storage; in stability tests, it did not increase appreciably in viscosity after 7 days at 120° F. or 7 days at 150 F.

In one illustration of the manner of using the above adhesive composition, the solution was cast onto a continuous web of silicone coated release paper at a casting weight of 1 pound (dry) per 50 square feet of coated area. The adhesive film was dried for 5 minutes at 150° F. and then cured at 275° F. for 5 minutes. The adhesive was then transferred to paper supported vinyl 0.012 inch thick by contacting the supported vinyl and the adhesive side of the coated release paper in squeeze rolls. The vinyl was a conventional material employed in automotive interiors, and is vinyl chloride polymer plasticized with a mixture of monomeric and polymeric plasticizers. The product thus was a roll of coated vinyl as shown in FIG. 1 of the attached drawing.

The above product was tested by applying the coated vinyl to a metallized ABS panel (acrylonitrile-butadiene-styrene plastic as used in automotive interiors). After 24 hours at room temperature, the assembly had a peel strength of 5.0 pounds per inch of width (90° angle, separation rate of 12 inches per minute), which is comparable to the commercial adhesives used for this purpose heretofore. When exposed to 180° F. for 24 hours, after which conventional adhesives (such as the same composition without polyisocyanate) have sharply reduced peel strength, the peel strength of the above product had increased to 7.5 pounds per inch of width.

EXAMPLE 2

An adhesive composition was made as in Example 1 except that the solution of dihydroabietyl phthalate was omitted. This adhesive was coated on release paper and samples transferred to several sheets of each of three types of vinyl, using the above procedure. The vinyls employed were as follows:

*Vinyl A.*—Unsupported vinyl chloride polymer sheet, 11 mils thick, highly plasticized. The plasticizers in this type of vinyl readily migrate and soften conventional pressure-sensitive adhesives.

*Vinyl B.*—Automotive trim type unsupported vinyl sheet, 11 mils thick. Corresponds to the vinyl used in Example 1 but without the paper support.

*Vinyl C.*—Wall covering type vinyl film 3.5 mils thick; high filler content and low plasticizer content with low proportion of monomeric plasticizer.

For comparison, an adhesive made up of the interpolymer solution alone was coated on other sheets of the same vinyls. The vinyl-adhesive-release paper assemblies were all aged for 7 days, some at room temperature and others at 140° F. The adhesive coated vinyls were then applied to stainless steel panels and the peel strengths determined as in Example 1. The results are shown in Table I, with the peel strengths reported in ounces per inch of width.

TABLE I

| Adhesive | Aging temp. | Vinyl A | B | C | Average |
|---|---|---|---|---|---|
| Example 2 | Room temperature | 54 | 52 | 52 | 53 |
| Control | Room temperature | 64 | 56 | 50 | 57 |
| Example 2 | 140° F | 56 | 60 | 56 | 57 |
| Control | 140° F | 42 | 44 | 26 | 37 |

As shown, the strength of the control samples in each instance drops drastically when the adhesive is heat aged in contact with the vinyls, whereas the adhesive of the invention actually increases in strength.

EXAMPLES 3–10

Several adhesives were prepared in the manner of Example 1 using Interpolymer A and one of the polyisocyanate prepolymers described above. The adhesive was coated on polyethylene terephthalate film (Mylar) at a weight of 1 pound (dry) per 75 square feet, dried as in Example 1, and aged for 7 days at room temperature or at 150° F. Samples of the coated Mylar were applied to stainless steel and the peel strengths determined as described above. The data are shown in Table II; the peel strengths are in ounces per inch of width and the —NCO ratio is the ratio of the equivalents of —NCO in the prepolymer to the equivalents of functional group in the interpolymer.

TABLE II

| Example | Prepolymer | —NCO ratio | Peel strength R.T. aging | 150° F. aging |
|---|---|---|---|---|
| 3 | K | 0.1628 | 48 | 56 |
| 4 | K | 0.0814 | 48 | 64 |
| 5 | L | 0.1608 | 60 | 64 |
| 6 | L | 0.0804 | 56 | 68 |
| 7 | M | 0.0732 | 72 | 72 |
| 8 | M | 0.0366 | 76 | 64 |
| 9 | O | 0.3130 | 72 | 80 |
| 10 | O | 0.1565 | 48 | 76 |

EXAMPLES 11-13

To show the effect of increasing prepolymer concentration, several adhesives were prepared in the manner of the above examples using Interpolymer B and Prepolymer J. These were tested as in Examples 3-10 above. The data are in Table III.

TABLE III

| Parts of prepolymer per 100 parts of interpolymer | —NCO ratio | Peel strength R.T. aging | 150° F. aging |
|---|---|---|---|
| 1.0 | 0.0422 | 34 | 32 |
| 2.5 | 0.105 | 30 | 30 |
| 5.0 | 0.210 | 16 | 16 |

As shown by the foregoing, the pressure sensitivity of the adhesives is reduced as the isocyanate concentration is increased. It should be noted that the level of pressure-sensitivity varies with the composition of the interpolymer and the polyisocyanate, and also depends in part upon whether any added tackifiers or other modifying materials were added. At higher —NCO ratios, it is especially desirable to include a tackifier or similar additive. All of the adhesives described above are pressure-sensitive and all retain their pressure-sensitivity on storage.

Other adhesives of the class herein can be made similarly to those above. The compositions of some of these are as follows with the quantities shown being based on resin solids content:

EXAMPLE 14

| | Parts by wt. |
|---|---|
| Interpolymer C | 100 |
| Methylene bis(4-phenylisocyanate) | 0.25 |

EXAMPLE 15

| | |
|---|---|
| Interpolymer D | 100 |
| Prepolymer N | 2.5 |
| Glycerol ester of hydrogenated rosin | 30.0 |

EXAMPLE 16

| | |
|---|---|
| Interpolymer E | 100 |
| Prepolymer O | 1.0 |

EXAMPLE 17

| | |
|---|---|
| Interpolymer F | 100 |
| Prepolymer L | 2.5 |
| Chlorinated biphenyl (100° C. melt point grade) | 25 |

EXAMPLE 18

| | |
|---|---|
| Interpolymer G | 100 |
| Prepolymer N | 5.0 |

EXAMPLE 19

| | |
|---|---|
| Interpolymer H | 100 |
| Prepolymer K | 2.0 |

In some of the above cases, it is best to mix the interpolymer and polyisocyanate just prior to utilization of the adhesive, this being particularly true of Examples 14, 15 and 16.

In addition to the use of the adhesives herein as transfer films, as shown by the above examples, they can also be used as a liquid adhesive by applying an organic solvent solution of the adhesive onto a substrate, as by brushing, spraying, rolling or the like, and then drying. The adhesive-coated substrate is then bonded to another surface in the usual manner.

According to the provisions of the patent statutes, there are described above the invention and what are now considered to be its best embodiments. However, within the scope of the appended claims, it is to be understood that the invention can be practiced otherwise than as specifically described.

What is claimed is:

1. A pressure-sensitive film adhesive comprising a dry, cured thin film of an adhesive composition consisting essentially of:
   (A) a normally tacky interpolymer of;
      (a) from about 30 to about 100 percent, based on the total of (a) and (b) herein, of one or more alkyl acrylates in which the alkyl groups have a linear carbon chain of from about 4 to about 12 carbon atoms,
      (b) from 0 to about 70 percent, based on the total of (a) and (b) herein, of one or more other copolymerizable ethylenic monomers devoid of active hydrogen atoms, said monomers being selected from the group consisting of monoolefinic aromatic hydrocarbons, halogenated monoolefinic hydrocarbons, esters and dienes, and
      (c) at least one copolymerizable ethylenic functional monomer containing a functional group having an active hydrogen atom, said functional monomer being present in an amount sufficient to provide from 0.005 to 0.210 equivalents of said functional group per 100 grams of interpolymer; and
   (B) an organic polyisocyanate;
      the amount of said organic polyisocyanate being sufficient to provide from about 0.01 to about 1.0 equivalent of isocyanato groups per equivalent of said functional group in said interpolymer.

2. The adhesive of claim 1 in which the film has been cured by heating at elevated temperature.

3. The adhesive of claim 1 in which said functional group is carboxyl, hydroxyl, amino, amido, N-hydroxyalkyl amido or N-alkoxyalkyl amido.

4. A composition which when dry forms a tacky pressure-sensitive film, comprising:
   (A) a normally tacky interpolymer of;
      (a) from about 30 to about 100 percent, based on the total of (a) and (b) herein, of one or more alkyl acrylates in which the alkyl groups have a linear carbon chain of from about 4 to about 12 carbon atoms,
      (b) from 0 to about 70 percent, based on the total of (a) and (b) herein of one or more other copolymerizable ethylenic monomers devoid of active hydrogen atoms, and
      (c) at least one copolymerizable ethylenic functional monomer containing a functional group having an active hydrogen atom, said functional monomer being present in an amount sufficient to provide from 0.005 to 0.210 equivalents of said functional groups per 100 grams of interpolymer;
   (B) an organic polyisocyanate; and
   (C) a tackifying resin;
      the amount of said organic polyisocyanate being sufficient to provide from about .01 to about 1.0 equivalent of isocyanato groups per equivalent of said functional group in said interpolymer, and from about 10 to about 150 parts of said tackifying resin being present per 100 parts of said interpolymer.

5. A storage composition for use as a pressure-sensitive adhesive, comprising a mixture of:
   (A) a normally tacky interpolymer of;
      (a) from about 30 to 100 percent, based on the total of (a) and (b) herein, of one or more alkyl acrylates in which the alkyl groups have a linear carbon chain of from about 4 to about 12 carbon atoms,
      (b) from 0 to about 70 percent, based on the total of (a) and (b) herein of one or more other copolymerizable ethylenic monomers devoid of active hydrogen atoms, and
      (c) at least one copolymerizable ethylenic functional monomer containing a carboxyl functional group, said functional monomer being present in an amount sufficient to provide from 0.005 to to 0.210 equivalents of said functional group per 100 grams of interpolymer; and (B) an organic polyisocyanate;
the amount of said organic polyisocyanate being sufficient to provide from about 0.01 to about 1.0 equivalent of isocyanato groups per equivalent of said functional group in said interpolymer.

6. The composition of claim 5 in which said functional monomer is acrylic acid or methacrylic acid.

7. The composition of claim 5 in which said organic polyisocyanate is an isocyanato-terminated adduct of an organic diisocyanate and a polyol.

8. The composition of claim 7 in which said polyol is castor oil.

9. Adhesive-coated sheet material comprising a thin backing member having thereon an adherent pressure-sensitive adhesive coating comprising:

(A) a normally tacky interpolymer of;
  (a) from about 30 to about 100 percent, based on the total of (a) and (b) herein, of one or more alkyl acrylates in which the alkyl groups have a linear carbon chain of from about 4 to about 12 carbon atoms,
  (b) from 0 to about 70 percent, based on the total of (a) and (b) herein of one or more other copolymerizable ethylenic monomers devoid of active hydrogen atoms, and
  (c) at least one copolymerizable ethylenic functional monomer containing a functional group having an active hydrogen atom, said functional monomer being present in an amount sufficient to provide from 0.005 to about 0.210 equivalents of said functional group per 100 grams of interpolymer; and (B) an organic polyisocyanate;
the amount of said organic polyisocyanate being sufficient to provide from about 0.01 to about 1.0 equivalent of isocyanato groups per equivalent of said functional group in said interpolymer.

10. The sheet material of claim 9 in which there is present from about 10 to about 150 parts per 100 parts of said interpolymer of an added tackifying resin.

11. The sheet material of claim 9 in which the functional monomer in said interpolymer is acrylic acid or methacrylic acid.

12. The sheet material of claim 9 in which said organic polyisocyanate is an isocyanato-terminated adduct of an organic diisocyanate and a polyol.

13. The sheet material of claim 9 in which said functional group is carboxyl, hydroxyl, amino, amido, N-hydroxyalkyl amido or N-alkoxyalkyl amido.

14. The sheet material of claim 9 in which said organic polyisocyanate is a hydrocarbon polyisocyanate or an isocyanato-terminated adduct of an organic polyisocyanate and a polyol.

15. The best sheet material of claim 9 in which said backing member is plasticized vinyl chloride polymer.

References Cited

UNITED STATES PATENTS

| | | | |
|---|---|---|---|
| 3,028,367 | 4/1962 | O'Brien | 260—77.5 |
| 3,108,986 | 10/1963 | Goldberg et al. | 260—41 |
| 3,245,941 | 4/1966 | Mayer et al. | 260—31.6 |
| 3,246,049 | 4/1966 | Webber | 260—829 |
| 3,262,827 | 7/1966 | Kallander et al. | 156—230 |
| 3,298,990 | 1/1967 | Cousens et al. | 260—30.4 |
| 3,312,563 | 4/1967 | Rusch | 117—33.3 |
| 3,321,349 | 5/1967 | Niviere | 156—230 |
| 3,284,415 | 11/1966 | Norvath | 260—77.5 |
| 3,409,595 | 11/1968 | Muller et al. | 260—77.5 |

DONALD E. CZAJA, Primary Examiner

R. A. WHITE, Assistant Examiner

U.S. Cl. X.R.

117—122; 156—230; 161—190; 260—77.5, 859